C. BRIZENDINE.
PLUMB AND LEVEL GAGE.
APPLICATION FILED AUG. 20, 1917.

1,271,128.

Patented July 2, 1918.

WITNESS:
Bernard Privat

INVENTOR.
Charles Brizendine
BY
Jerry J. Webster
ATTORNEY

UNITED STATES PATENT OFFICE.

CHARLES BRIZENDINE, OF STOCKTON, CALIFORNIA.

PLUMB AND LEVEL GAGE.

1,271,128.　　　　Specification of Letters Patent.　　Patented July 2, 1918.

Application filed August 20, 1917.　Serial No. 187,239.

*To all whom it may concern:*

Be it known that I, CHARLES BRIZENDINE, a citizen of the United States, residing at Stockton, county of San Joaquin, State of California, have invented certain new and useful Improvements in Plumb and Level Gages; and I do declare the following to be a full, clear, and exact description of the same, reference being had to the accompanying drawings, and to the characters of reference marked thereon, which form a part of this application.

This invention relates to improvements in paraphernalia for plumbing and leveling any piece of construction work and the object of the invention is to provide a small attachment for use on a steel square whereby the plumbing and leveling may be done in an easy, rapid and effective manner without the necessity of using any of the common forms of gages such as the bubble gage or the like. My improved invention consists of a small attachment which can be carried in the pocket of the user and when it is desired to plumb or level any work it can be easily and quickly attached to the steel square and the plumb and level determined in the manner set forth herein.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views.

Figure 1:
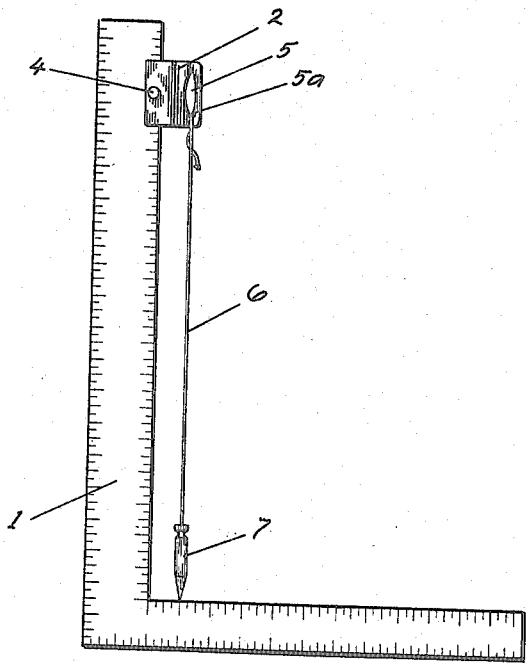
Figure 1 is an elevation of a steel square showing my improved plumb and level gage thereon.
Figure 2:
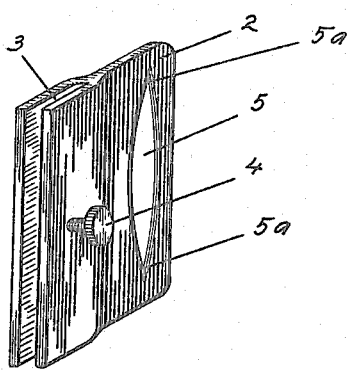
Fig. 2 is a perspective view of the independent attachment arranged to be affixed to the steel square.

Referring now more particularly to the characters of reference on the drawings the numeral 1 designates the square which can be of any desired type. My improved invention consists of a small plate 2 bifurcated as at 3 whereby it may be projected over the square 1 and fixed thereto by means of a set screw 4. The plate 2 is provided with an open slot 5 reduced at its ends to form notches as at 5ª. When the plate 2 is fitted over the square 1 the distance from the inner edge of the square to the notch 5ª is predetermined as say for instance one inch. When it is desired to use the device as a plumb gage the square 1 is set against the vertical structure desired to be made plumb and the plumb line 6 is then projected through the slot 5 and secured in the notch 5ª (the line 6 being provided with a knot or other suitable holding means for the purpose). The position of the plumb bob 7 is then noted and if it points at the one inch indication on the other side of the square 1 this indicates that the structure is plumb. If it does not point to the one inch indication then the structure may be altered until it is found to be plumb in the manner set forth above. Similarly the device may be used as a level by placing the lower side of the square on the structure to be leveled and likewise noting the position of the plumb bob 7.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention as defined by the appended claim.

Having thus described my invention what I claim as new and useful and desire to secure by Letters Patent is:

A device of the character described comprising a plate, a means for fixing the plate to a square, the plate being provided with a slot terminating in a notch whereby a plumb line may be suspended therein.

In testimony whereof I affix my signature.

CHARLES BRIZENDINE.

Copies of this patent may be obtained for five cents each, by addressing the "Commissioner of Patents, Washington, D. C."